Dec. 21, 1943.    D. W. NORWOOD    2,337,122
METHOD AND APPARATUS FOR DETERMINING ILLUMINATION CONTRAST
Filed Aug. 18, 1941    3 Sheets-Sheet 1
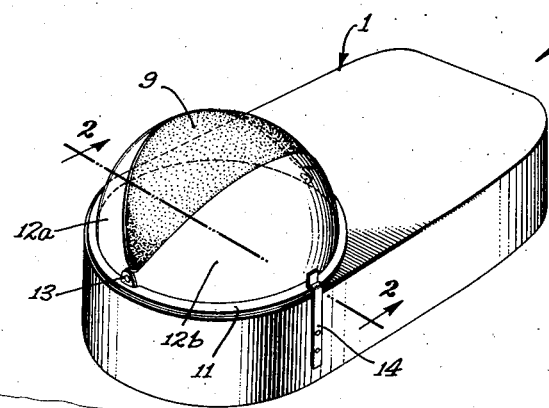
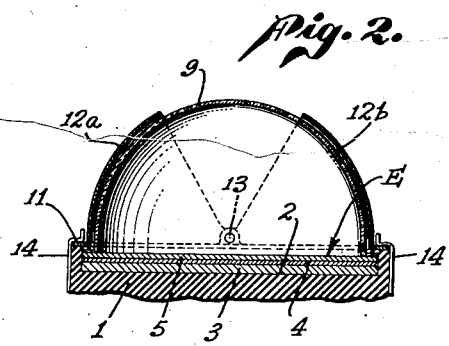
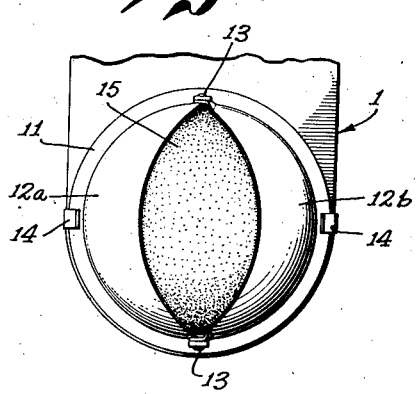
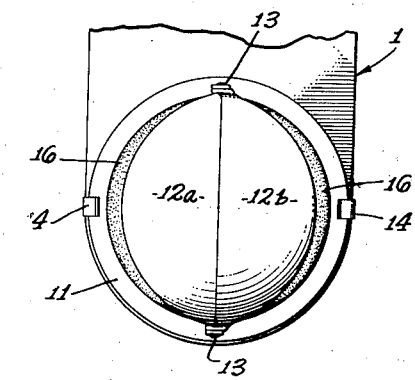
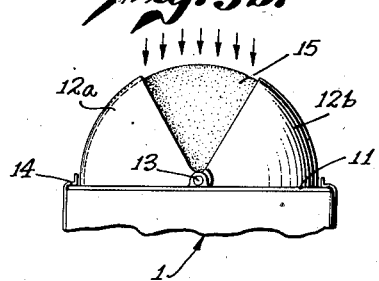
DONALD W. NORWOOD,
INVENTOR
BY
ATTORNEY.

Dec. 21, 1943.  D. W. NORWOOD  2,337,122
METHOD AND APPARATUS FOR DETERMINING ILLUMINATION CONTRAST
Filed Aug. 18, 1941  3 Sheets-Sheet 2

DONALD W. NORWOOD,
INVENTOR

BY
ATTORNEY.

Dec. 21, 1943.                D. W. NORWOOD                2,337,122
        METHOD AND APPARATUS FOR DETERMINING ILLUMINATION CONTRAST
                    Filed Aug. 18, 1941          3 Sheets-Sheet 3

DONALD W. NORWOOD,
        INVENTOR

BY
        ATTORNEY.

Patented Dec. 21, 1943

2,337,122

UNITED STATES PATENT OFFICE 2,337,122

METHOD AND APPARATUS FOR DETERMINING ILLUMINATION CONTRAST

Donald W. Norwood, Pasadena, Calif.

Application August 18, 1941, Serial No. 407,314

13 Claims. (Cl. 88—23)

This invention relates to so-called "light-meters," which are commonly used in photography, and pertains particularly to a method and apparatus for the determination or estimation of the degree of contrast in a photographic subject resulting from ununiform illumination.

It is well known that when a photographic subject is not uniformly illuminated it is quite difficult at times to secure adequate detail in the shadow portions without making the highlight portions "chalky." Many photographic emulsions are now available with a rather large latitude of exposure, for example, as high as 125 to 1. With such an emulsion, a correct exposure of practically any subject will give a fair highlight and shadow rendition, but where the emulsion is one having a quite narrow exposure latitude, not only must the exposure of the negative be made quite correctly in order to secure a good rendition, but the brightness range in the subject itself must be quite short in order to prevent overexposure of the highlights or underexposure of the shadow portions of the subject. It is an important object of this invention to provide for measuring quantitatively the relative intensities of illumination to which a subject will be subjected in the highlight and shadow areas, wherefore the illumination contrast range may definitely be ascertained.

A further important object of my invention is to provide for measuring the directional effect of the light falling on a three-dimensional subject, wherefore the photographic effect thereof may be ascertained.

A further object of the invention is to provide a device of the character described, having a three-dimensional light-receiving surface (as distinguished from a plane surface) of a partially reflective nature, whereby the highlight and shadow appearance may be relied upon to estimate the directions in which light is predominantly falling upon such surface, together with masking means adapted to expose a given proportion of the surface area of such surface in one instance to the light falling thereupon which would result in the illumination of the highlight portion thereof, and in another instance to the light falling thereupon which would result in the illumination of the shadow portion thereof.

A further object of the invention is to provide a masking device adapted for use with an exposure meter of the type described in my U. S. Patent No. 2,214,283, issued September 10, 1940, to provide selective exposure of different areas of the light-receiving surface of such exposure meter.

A further object of the invention is to provide a method of determining a relative illumination contrast on a three-dimensional photographic subject resulting from the directional effect of light falling on the subject from different angles.

The method of the present invention may comprise the steps of exposing a convex light-receiving element over only a restricted area so positioned as to receive only light corresponding in direction and intensity to light which would cause the production of a highlight area in the photographic subject involved in a particular photographic problem, making a measurement of the light so received, exposing a convex light-receiving surface over only a restricted area so positioned as to receive only light corresponding in direction and intensity to light which would illuminate the shadow area of such subject, making a measurement of the light so received, and comparing the two light measurements in relation to the size of the area exposed for the two measurements to determine the relationship between the ratio of the two light measurements and the ratio of the areas employed, and provide an indication of the illumination contrast in said subject resulting from the directional effect of the light falling thereupon.

In a more preferred embodiment, the method of this invention may comprise, in general, the steps of placing a light-receiving element of convex surface configuration along an axis corresponding to the photographic axis to be employed in a particular photographic problem, orienting such light-receiving surface to cause the same to receive illumination in substantially the same manner as such illumination would be received by the photographic subject, observing the highlight and shadow pattern on said light-receiving surface produced by the light incident thereon, exposing one restricted area of the highlighted portion of such light-receiving surface to the direct impingement of light causing the production of highlights on such surface while covering the remaining portions of such surface, measuring the light quantity resulting from such exposure, covering the highlight portion of said light-receiving surface and exposing another portion of such surface at the shadow portion thereof, over a second restricted area comparable to said one area, to light incident upon said other portion (or, alternatively, rotating the light-receiving element so as to cause said one restricted area to be exposed only to light which would cause illumination of the shadow areas, i. e., by rotating the light-receiving element so that said one restricted area is located at a position corresponding to the "shadow" portion of said highlight and shadow pattern), measuring the quantity of light received in said last-mentioned exposure, and comparing the two light measurements in relation to the size ratio of said two restricted areas to determine the relationship between the ratio of the two light intensities and the ratio of the two areas, and provide an indication of the illumination contrast resulting from the directional effect of the light falling on said light-receiving surface.

The device of the present invention may comprise a masking device in combination with a direct-reading exposure meter of the type provided with a translucent, diffusing, light-receiving element of convex surface configuration, such masking device having a substantially light-impervious portion adapted to conform closely to the configuration of said light-receiving element to shield a restricted area portion of the surface of said element, and defining an opening through which another portion of such surface is exposed to receive light through substantially the full solid angle of light acceptance to which said other portion would be adapted to receive light in the absence of said masking device.

In its more preferred embodiments, the device of the present invention may comprise a variable masking member or members shaped to closely conform to and disposed in cooperating relationship with a light-receiving element of convex surface configuration which is associated with a light-indicating means, such variable masking member or members being adapted, in one position, to cover the principal proportion of such convex surface and to expose an uncovered portion to light falling on such surface in such manner as to restrict the acceptance of light to light incident upon the meter in directions within a solid angle corresponding to that portion of the illumination which produces a photographic highlight in a photographic subject, and being adapted when in another position to cover the area exposed in said one position and to expose another portion to light falling on said surface in such manner as to restrict the acceptance of light to light incident upon the meter in directions within a solid angle or angles corresponding to that portion of the illumination that illuminates a shadow area in such a photographic subject.

Other features and objects of the invention will be brought out in the ensuing description of certain embodiments thereof, as illustrated in the accompanying drawings, in which:

Fig. 1 shows, in perspective, a complete illumination contrast meter of this invention;

Fig. 2 is a sectional detail thereof as taken on line 2—2 in Fig. 1;

Figs. 3a and 3b are plan and side elevational views, respectively, of the form of device shown in Figs. 1 and 2, showing the variable masking members disposed in position to give a reading of the "highlight" illumination, assuming the source of illumination to be positioned directly in front of the meter;

Figs. 4a and 4b are plan and side elevational views, respectively, of the same form of device, showing the variable masking members disposed in position to give a reading of the "shadow" illumination;

Figure 5A:
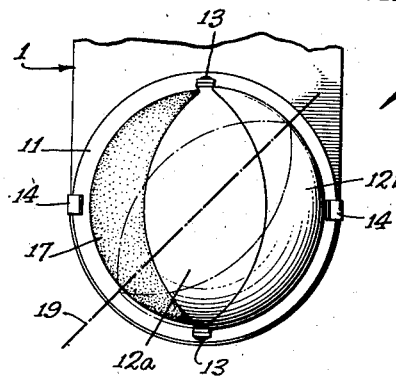
Figs. 5a and 5b are plan and side elevational views, respectively, of the same form of device, showing the variable masking members disposed in position to give a reading of the "highlight" illumination when such illumination is received from an inclined direction.
Figure 5B:
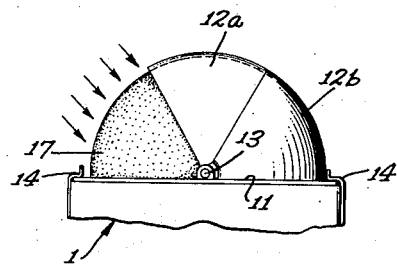
Figure 6A:
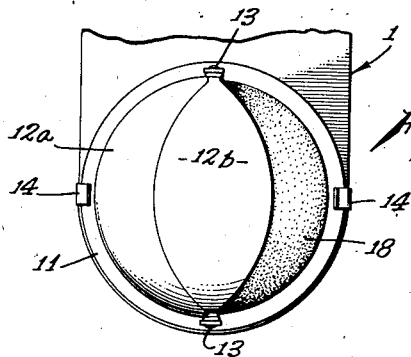
Figure 6B:
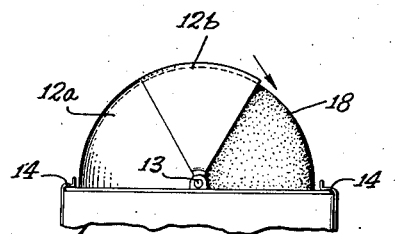
Figure 7A:
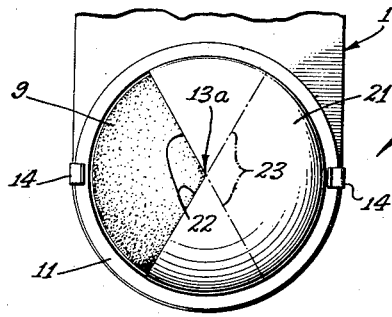
Figure 7B:
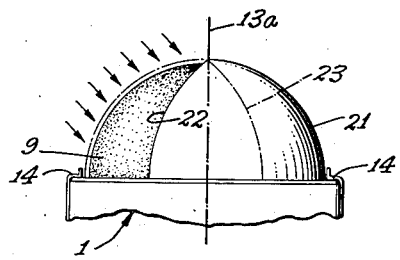
Figure 8A:
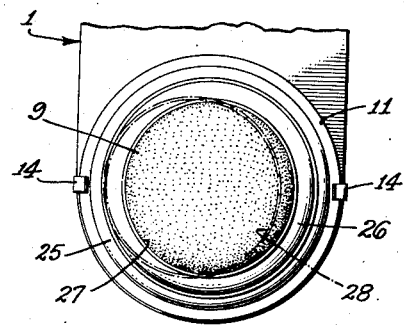
Figure 8B:
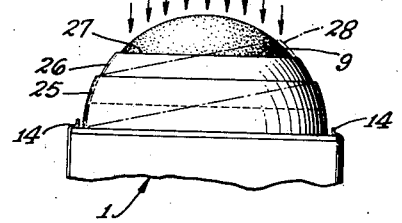
Figure 9A:
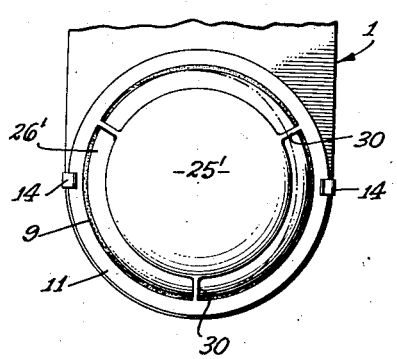
Figure 9B:
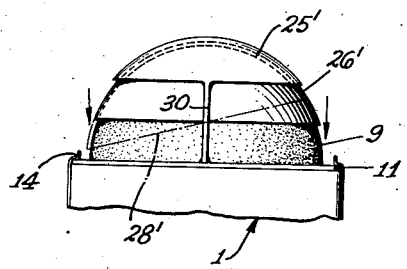
Figure 11:
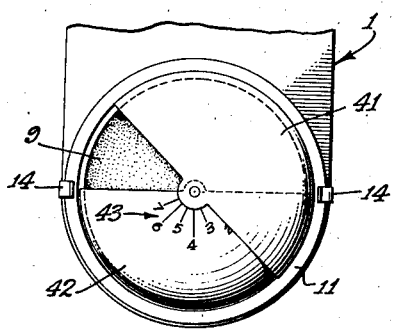
Figure 10:
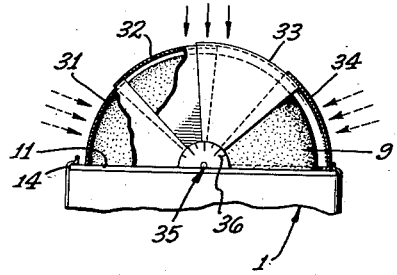

Figs. 6a and 6b correspond to Figs. 5a and 5b and show the variable masking members disposed in position to give a reading of the "shadow" illumination under the same illumination conditions as were obtaining in the case of Figs. 5a and 5b;

Figs. 7a and 7b are plan and side elevational views, respectively, of a modified form of the device employing a single rotatable masking member, showing the position of the masking member for the "highlight" reading when the principal illumination is incident from the same direction as in Figs. 5a through 6b;

Figs. 8a and 8b are plan and side elevational views, respectively, of a further modified form of the invention provided with a variable masking member adapted to give a reading of the "highlight" illumination;

Figs. 9a and 9b are plan and side elevational views, respectively, of a form of the device adapted to give a reading of the "shadow" illumination; and Figs. 10 and 11 are side elevation and plan views, respectively, of two additional forms of the device.

In the ensuing description reference will be had specifically to the type of exposure meter shown in the above-mentioned Patent No. 2,214,283, which measures light corresponding to that incident upon the photographic subject rather than the light reflected from such subject.

This type of exposure meter is provided with a translucent, diffusing, light-receiving element of substantially hemispherical or other suitable convex shape. When the meter is placed at the position of the photographic subject and this convex light-receiving element is directed toward the camera position, this light-receiving element receives light from practically all directions which would result in the reflection of light to the camera from a normal three-dimensional photographic subject. The meter is equivalently useful at positions other than the position of the subject, for example, at the position of the camera, in cases where the illumination at such other position is fully equivalent to the illumination at the subject position, as in many exterior "shots," provided the light-receiving element of the meter is directed parallel to the camera-subject axis and in the same direction as though it were placed at the subject position and were directed toward the camera position.

For the purpose of simplicity, I have employed, whereever practicable, the same reference numerals in the instant description as were used for corresponding parts in the description of the device of the aforesaid patent, and in reference particularly to Figs. 1 and 2, the direct-light exposure meter of the character described is shown as comprising a base portion 1 provided with a recess 2 carrying a photo-sensitive structure which, for the purpose of simplicity, is illustrated as of the conventional "photovoltaic" type, i. e., a type which acts as a variable source of electrical energy, as opposed to the "photoelectric" cell which requires an external source of electrical energy and may be considered as a variable resistor of electrical energy. It will be apparent that as far as the teachings of the present invention are concerned, cells of either type are contemplated, and equally adapted to use according to this invention, although the present description is concerned primarily with the photovoltaic type due to the fact that no outside source of energy is required and the constructions are simplified to this extent; those skilled in the art will appreciate the technical equivalence of these two types of photo-responsive elements, and the expression "photo-responsive element" as used hereinafter will be interpreted as including both types of devices.

The light-sensitive element may comprise a back layer 3 of conducting metal, for example, provided with a photosensitive layer 4 such as of selenium or cuprous oxide, which is in turn provided with a semi-transparent electrically conductive layer 5, such as a sputtered layer of gold or other suitable metal. Electrical connections are provided to the base 3 and the conducting layer 5 to a suitable microammeter or the like adapted to provide a visible indication of the amount of light to which the photo-sensitive element is exposed, as described in the patent.

In order to secure effective observation or measurement of light falling upon the device through a solid angle materially greater than $2\pi$ steradians, I provide a translucent, light-receiving member 9 disposed outwardly of the photo-responsive element, and of convex surface configuration. The light-receiving element 9 is shown as substantially hemispherical in shape, whereby the normals to the various portions of its light-receiving surface all lie within and are distributed over a solid angle of substantially $2\pi$ steradians. Convex surfaces which depart from true hemispherical shape, such as ovate or ellipsoidal surfaces, will also be useful.

The device of the present invention is adapted to be incorporated with the above-described exposure meter construction, or, more preferably, removably mounted with respect thereto. Figs. 1 and 2 illustrate one form of masking device which comprises a ring 11 which is adapted to fit closely around the base of the member 9, and two opaque masking sectors 12a and 12b are pivotally mounted thereon for movement about a diametrical axis indicated at 13. The mask structure may be removably secured to the base 1 in any suitable manner, as by means of spring clamps 14 adapted to engage the outer edge of the ring 11.

The mask sectors 12a and 12b may be of such size as to cover any desired proportion of the surface area of the member 9; for example, each of these sectors may cover approximately one-third of the total hemispherical surface and leave one-third of the surface area exposed for reception of light.

For use in measuring illumination contrast, the device may be placed at the position of the photographic subject and oriented toward the camera position. The light-receiving element 9 is preferably made of some white or light-colored material such as translucent Celluloid or the like, so that when in this position and with the masking means removed, observation of the highlight and shadow pattern on the surface of the element 9 will indicate the location of the most highly illuminated and least illuminated portions of the hemisphere, depending upon the direction of incidence of the principal proportion of light, simulating the "highlight" and "shadow" portions of the photographic subject. The masking means is intended to be so arranged that, when placed in position over the light-receiving element, it may be moved to one position so as to expose the surface of said element only over a highlight portion thereof, and to another position to expose such surface only over a shadow portion thereof.

Figs. 3a—3b through 6a—6b illustrate how this may be done with a mask of the type shown in Figs. 1 and 2.

Figure 4B:
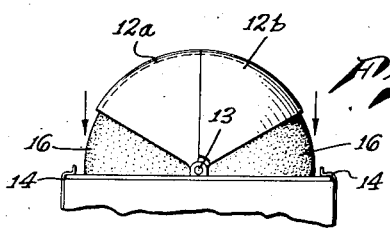

If the principal direction of the light is from directly in front of the photographic subject position, a reading of the light intensity may first be made with the mask segments 12a and 12b positioned as shown in Figs. 3a and 3b, so as to receive light only on the centrally located highlight portion 15, and another reading may then be taken with the mask segments 12a and 12b positioned as shown in Figs. 4a and 4b, so as to measure only the light received on the lateral shadow portion 16. In either case, the open area of the surface 9 is exposed to receive light through substantially the full solid angle of light acceptance to which it would be adapted to receive light if the mask segments were not present.

If the light comes principally from the left side, the intensity of highlight illumination may be measured with the masks in the positions shown in Figs. 5a and 5b, with only the left-hand portion 17 of the surface exposed to receive light, while the intensity of illumination of the shadow portion may be measured with the masks in the positions shown in Figs. 6a and 6b, exposing only the right-hand portion 18 of the light-receiving surface. In each case it will be seen that the edges of the opening defined by the masking elements, through which the desired limited portion of the light-receiving surface is exposed, conform substantially to arcs of great circles about the center of the hemispherical light-receiving surface.

The entire mask structure may also be rotated to different angular positions to take care of other variations in the direction of the incident light. For example, if the light comes from above and to the left, the ring 11 may be rotated to bring the pivotal axis of the mask segments to the position indicated by the dot-dash line at 19 in Fig. 5a, and measurements of the highlight and shadow illumination may be made in the same manner as above.

In each of the above examples, the masking means when in one position restricts the light acceptance of the meter to light incident thereupon in directions within a solid angle corresponding to that portion of the illumination which is such as to produce a photographic highlight in the subject, and when in the other position the masking means restricts the light acceptance of the meter to light incident thereupon in directions within a solid angle or angles corresponding to that portion of the illumination which is such as to illuminate a shadow area in such subject.

Another form of mask is illustrated in Figs. 7a and 7b, which comprises a hemispherical mask 21 mounted over the light-receiving surface 9, with a cut-away sector of, say, 120° as indicated at 22. With light coming from the left, the highlight illumination may be measured with the mask in the position shown, and the entire structure or the mask only may then be rotated to bring the cut-away sector to the dotted position 23 for measuring the shadow illumination. In this form of device the hemispherical mask may be slidably and rotatably mounted on the ring 11, whereby it is pivotally rotatable about an axis located centrally of the member 9 and substantially normal thereto, as at 13a, in which case the mask only need be rotated to secure the desired relative placement of the cut-away sector, or it may be fixedly mounted with respect to the light-receiving element, in which case the desired relative placement of the cut-away sector may be secured by bodily rotation of the entire structure.

Another modification is illustrated in Figs. 8a—8b and 9a—9b, separate masking means being used in this case for measuring the highlight and shadow illuminations.

In Figs. 8a—8b, the mask comprises a member 25 rigidly secured to the ring 11 and a member 26 fitting slidably within the upper portion of member 25 and provided with a central opening 27. In the position shown, this opening 27 exposes the central portion of the light-receiving surface 9, in which position the highlight illumination may be measured if the light comes from directly in front of the subject. The inner mask member 26 may be tilted to other positions such as indicated in dotted lines at 28, for measuring the highlight illumination with light coming somewhat to the left or right, or above or below.

The other masking means for use in measuring the shadow illumination is illustrated in Figs. 9a and 9b, and comprises a member 25' secured to the ring 11 by supporting arms 30 and a member 26' fitting slidably within the member 25', with its lower edge spaced from the ring 11, so as to expose only the portion of the light-receiving element 9 near the base thereof, of the same area as that exposed through the central opening 27 in Figs. 8a and 8b. In this case also, the member 26' may be tilted to other positions, for example, as indicated in dotted lines at 28'.

In Figs. 8a, 8b, 9a, and 9b, the respective masking members 26 and 26' are constrained to movement in a spherical path concentric to the surface of the member 9. This movement is essentially "pivotal," in the sense of movement about the center of the spherical path.

In general, the areas of the light-receiving surface which are respectively exposed for the highlight and shadow measurements may be substantially equal, wherefore the ratio of the two measurements as indicated by the microammeter will afford a direct indication of the degree of contrast in the illumination of these portions, such as 2 to 1, 5 to 1, etc. At the same time, this equivalent area relation is obviously not essential, inasmuch as the area which is uncovered for the shadow measurement may advantageously be made greater than the area uncovered for the highlight measurement in order to increase the sensitivity of the device in cases where the shadow illumination would be quite dim. If any ratio between the highlight and shadow areas other than 1 to 1 is established, it will be necessary to include this ratio relation in the estimation of the net illumination attributable to the highlight and shadow illumination.

The measurement of the highlight and shadow illumination may also be effected by exposing a known area of the light-receiving element to the highlight or shadow illumination, observing the response indicated by the microammeter or other indicating means, covering the area thus exposed and uncovering a sufficient proportion of the area of the light-receiving element which is illuminated by the other type of illumination, i. e., shadow or highlight illumination, to cause the microammeter to give the same reading as first obtained. In this practice of the invention the highlight and shadow illumination ratio is inversely proportional to the areas exposed, wherefore the contrast may be ascertained by comparison of the respective areas of exposure which were employed.

In Figs. 10 and 11 I have illustrated two forms of masking device which may be employed as described immediately above, and referring to Fig. 10, the base portion of the device is indicated at 1, the light-receiving element is indicated at 9, and the masking means may comprise four sectors 31, 32, 33, and 34, pivotally mounted about a diametrical axis 35 and secured to a mounting ring 11. These sectors are of increasing radii whereby they will telescope within one another as indicated. In this figure the four sectors are shown in such position as to completely cover the surface 9. If the highlight illumination is directed upon the device as indicated by the small arrows, the sector 33 may be rotated clockwise and the sector 32 rotated counterclockwise to provide a segmental opening at the central portion of the surface 9. A suitable fixed scale 36 may be provided adjacent the pivot axis 35 for estimation of the extent of this opening. Assume in a specific instance that with an opening of approximately one-eighth, a reading of 10 is secured on the microammeter. The sectors 32 and 33 are closed and the sectors 31 and 34 raised to uncover the shadow portions, which may be assumed to be near the base of the surface 9, receiving light from the directions indicated by the dashed arrows. The sectors 31 and 34 will then be pulled away from the base 1 in an amount sufficient to give a reading of 10 on the microammeter. If an opening of, for example, three-eighths is then indicated on the scale 36, the ratio of highlight to shadow illumination will be 3 to 1. The sectors will be so constructed as to telescope quite closely within one another, while closely conforming to the configuration of the light-receiving surface, so that substantially no shading of the exposed area by the adjacent sectors will be had, whereby the exposed portion is exposed to receive light through substantially the full solid angle of light acceptance to which it would be capable in the absence of such adjacent sectors.

In the form of device shown in Fig. 11, the photo-sensitive surface 9 is covered one-half way over by an outer mask sector 41 which is fixed to a mounting ring 11, and pivotally mounted to this sector 41 is an inner sector 42 which may be rotated through an angle of 180° or more so as to completely cover the surface 9 or fully expose substantially one-half of this surface. Suitable scale markings 43 may be provided on the inner sector 42 for estimation of the extent of the opening provided. The operation of this form of the device is entirely comparable to that of the form shown in Fig. 10.

Other modifications of the invention will occur to those skilled in the art and I do not choose to be limited to the specific forms herein delineated and described, but rather to the scope of the subjoined claims.

I claim:

1. A device for use in connection with a direct-reading exposure meter of the type provided with a translucent, diffusing, light-receiving element of convex surface configuration, for measuring illumination contrast, said device comprising a substantially light-impervious masking element adapted to be mounted over said light-receiving element in position to cover a portion of the surface of said light-receiving element while leaving another portion of said surface exposed for reception of incident light, said masking element being movable to different positions relative to said surface to respectively cover and expose different portions of said surface, whereby said meter will be selectively responsive to light incident thereupon in directions within different solid angles upon movement of said masking element to said different positions.

2. In an illumination contrast meter, a variable masking device adapted for use with a direct-reading exposure meter of the type provided with a translucent, diffusing, light-receiving element having a surface of convex configuration, which comprises: a substantially light-impervious masking member movably mounted with respect to said light-receiving element and adapted to cover a portion of such surface and to uncover another portion of such surface, whereby a restricted portion of the area of said surface may be exposed to incident light while the remaining portions of the area of such surface are shielded against exposure and the directional light receptiveness of said light-receiving element is restricted to a solid angle less than the angle of receptiveness of said element in the absence of said masking member.

3. An illumination contrast meter which comprises, in combination with a direct-reading exposure meter of the type provided with a translucent, diffusing, light-receiving element of convex configuration, a substantially light-impervious variable masking member movably mounted on said exposure meter in light-shielding relation to one portion of said convex light-receiving element while exposing another portion of said element, said masking member being movable to a position in light-shielding relation to said other portion, whereby said meter will be selectively responsive to light incident thereupon in directions within different solid angles upon movement of said masking member to change the light-shielding relation thereof.

4. An illumination contrast meter which comprises, in combination with a direct-reading exposure meter of the type provided with a translucent, diffusing, light-receiving element of convex substantially hemispherical surface configuration, a masking device having a substantially light-impervious portion adapted to conform closely to the configuration of said light-receiving element and to shield a restricted area portion of the surface of said light-receiving element and defining an opening through which another portion of said surface is exposed to receive light through substantially the full solid angle of light acceptance to which said other portion would be adapted to receive light in the absence of said masking device while restricting the directional light-receiving characteristics of said meter as a whole to a solid angle smaller than the angle of receptiveness of said light-receiving element in the absence of such masking device.

5. An illumination contrast meter which comprises, in combination with a direct-reading exposure meter of the type provided with a translucent, diffusing, light-receiving element of convex substantially hemispherical surface configuration, a masking device removably secured to said meter and having a substantially light-impervious portion adapted to conform closely to the configuration of said light-receiving element and to shield a restricted area portion of the surface of said light-receiving element and defining an opening through which another portion of said surface is exposed to receive light through substantially the full solid angle of light acceptance to which said other portion would be adapted to receive light in the absence of said masking device while restricting the directional light-receiving characteristics of said meter as a whole to a solid angle smaller than the angle of receptiveness of said light-receiving element in the absence of such masking device.

6. An illumination contrast meter which comprises, in combination with a direct-reading exposure meter of the type provided with a translucent, diffusing, light-receiving element of convex substantially hemispherical surface configuration, a masking device having a substantially light-impervious portion adapted to conform closely to the configuration of said light-receiving element and to shield a restricted area portion of the surface of said light-receiving element and defining an opening through which another portion of said surface is exposed to receive light through substantially the full solid angle of light acceptance to which said other portion would be adapted to receive light in the absence of said masking device while restricting the directional light-receiving characteristics of said meter as a whole to a solid angle smaller than the angle of receptiveness of said light-receiving element in the absence of such masking device, said masking device being removably secured to said exposure meter and adapted to be secured thereto in any one of a plurality of different positions in which the substantially light-impervious portion of the masking device shields different restricted portions of the surface of said light-receiving element.

7. An illumination contrast meter which comprises, in combination with a direct-reading exposure meter of the type provided with a translucent, diffusing, light-receiving element of convex substantially hemispherical surface configuration, a masking device having a substantially light-impervious portion adapted to conform closely to the configuration of said light-receiving element and to shield a restricted area portion of the surface of said light-receiving element and defining an opening whose edges conform substantially to arcs of great circles about the center of the hemispherical surface of said light-receiving element and through which another portion of said surface is exposed to receive light through substantially the full solid angle of light acceptance to which said other portion would be adapted to receive light in the absence of said masking device while restricting the directional light-receiving characteristics of said meter as a whole to a solid angle smaller than the angle of receptiveness of said light-receiving element in the absence of such masking device.

8. An illumination contrast meter which comprises, in combination with a direct-reading exposure meter of the type provided with a translucent, diffusing, light-receiving element of convex surface configuration, a masking device comprising a relatively movable portion and a relatively fixed portion, both of said portions being substantially light-impervious and shaped to conform closely to the configuration of said light-receiving element and movable with respect to said element, said relatively fixed portion being adapted to shield a portion of said surface against incident light and said relatively movable portion being adapted to cooperate with said relatively fixed portion to shield an additional portion of said surface against incident light and to define therewith an opening through which the remaining portion of such surface is exposed to receive light.

9. An illumination contrast meter which comprises, in combination with a direct-reading exposure meter of the type provided with a translucent, diffusing, light-receiving element of convex surface configuration, a masking device of curved configuration adapted to conform closely to the configuration of said light-receiving element, said masking device comprising two substantially light-impervious masking elements pivotally mounted on said exposure meter for movement over the outer surface of said light-receiving element in light-shielding relation thereto, and the sums of the areas of said two opaque elements being less than the total area of said light-receiving element whereby the area covered by said two opaque elements is at all times less than such total area, leaving a portion of such area of said light-receiving element exposed to receive light.

10. The method of determining the relative illumination contrast on a three-dimensional photographic subject resulting from the directional effect of light falling thereupon from different angles, which comprises: establishing an observation axis directionally corresponding to the photographic axis to be employed in photographing such subject; placing upon such observation axis a light-responsive metering means provided with a translucent and diffusing light-receiving element having a surface of convex configuration, with such surface being directed away from the position of said subject, observing the highlight and shadow pattern produced upon said surface by such light; covering a portion of said surface to exclude light therefrom over the shadow pattern area thereof and to expose a given area of said surface at the highlight pattern area thereof; determining the response of said metering means to the light falling upon said given area; covering said given area and exposing another area at the position of the shadow pattern on said surface; determining the response of said metering means to the light falling upon said other area; and calculating the relative intensity of light falling upon said given and said other area in relation to the ratio of the sizes of such areas.

11. In a method of determining the relative illumination contrast on a three-dimensional photographic subject resulting from the directional effect of light falling thereupon from different angles, the steps which comprise; establishing an observation axis directionally corresponding to the photographic axis to be employed in photographing such subject; placing upon such observation axis a light-responsive metering means provided with a translucent and diffusing light-receiving element having a surface of convex configuration, with such surface being directed away from the position of said subject, observing the highlight and shadow pattern produced upon said surface by such light; covering a portion of said surface to exclude light therefrom over the shadow pattern area thereof and to expose another portion of said surface, of known area, at the highlight pattern area thereof, determining the response of said metering means to the light falling upon said portion of known area; covering a portion of said surface to exclude light therefrom over the highlight pattern area thereof and to expose another portion of said surface, of known area, at the shadow pattern area thereof, and determining the response of said metering means to the light falling upon said last-mentioned portion of known area.

12. The invention set forth in claim 11, in which said portions of known area are of substantially the same size.

13. The method of determining the relative illumination contrast of a given three-dimensional photographic subject resulting from the directional effect of light falling thereupon from different angles, which comprises: exposing to such light a direct-reading photo-responsive exposure meter of the type provided with a three-dimensional translucent and diffusing light-receiving element having a surface of convex configuration, such exposure meter being directed toward such light in such manner that the illumination of said surface corresponds substantially to the illumination which would be produced thereon by such light if said meter were placed at the position of said given photographic subject with said convex surface symmetrically directed toward the camera position to be employed in connection with the photography of said subject; observing the highlight and shadow pattern produced upon said surface by such light; covering a portion of said surface to exclude light therefrom over the shadow pattern area thereof and to expose one restricted area of said surface at the highlight pattern area thereof; determining the response of said metering means to the light falling upon said one area; covering said given area and exposing another restricted area at the position of the shadow pattern on said surface; determining the response of said metering means to the light falling upon said other area; and calculating the relative intensity of light falling upon said areas in relation to the ratio of the sizes of such areas.

DONALD W. NORWOOD.